Nov. 3, 1964   R. R. CORDELL ETAL   3,155,542
COTTONSEED-TREATING MACHINE
Filed Sept. 22, 1960

INVENTORS
RAY R. CORDELL,
WAYNE F. GUSTAFSON
BY Everett J. Schroeder
ATTORNEY

United States Patent Office 3,155,542
Patented Nov. 3, 1964

3,155,542
COTTONSEED-TREATING MACHINE
Ray R. Cordell and Wayne F. Gustafson, Minneapolis, Minn., assignors to Ben Gustafson & Son Manufacturing Company, Minneapolis, Minn., a corporation of Minnesota
Filed Sept. 22, 1960, Ser. No. 57,810
6 Claims. (Cl. 118—303)

This invention relates to seed-treating machines. More particularly, it relates to seed-treating machines capable of treating seeds such as cottonseeds with a liquid chemical in such a way as to overcome the deficiencies of machines heretofore known when attempting to treat cottonseeds and seeds of similar plants which have unique inherent disadvantages insofar as treatment is concerned.

It is a general object of our invention to provide a novel and improved seed-treating machine capable of efficiently and effectively treating seeds of unique types such as cottonseeds, etc.

A more specific object is to provide a novel and improved seed-treating machine constructed and arranged in a novel manner to enable the operator to effectively treat seeds such as cotton seeds which have been only partially delinted and hence have inherent tendencies to ball up and consequently interrupt the feeding operation as well as the actual treatment operation.

Another object is to provide a novel and improved seed-treating machine capable of providing a uniform distribution of seeds despite their partially delinted condition in order to assure uniform coverage of the individual seeds by a liquid chemical which is applied thereto.

Another object is to provide a novel and improved seed-treating machine constructed to provide a uniform distribution of seeds and to present the seeds in a substantially single seed layer to the seed-treating chemical to thereby insure that each individual seed is subjected to the liquid chemical.

Another object is to provide a novel and improved seed-treating machine capable of not only distributing the seeds uniformly but also tumbling the seeds in such a manner as to increase the coverage and application of the liquid chemical to a substantially greater extent with respect to the entire outer surface of the individual seeds.

Anoher object is to provide a novel and improved seed-treating machine which is adaptable to seeds of various sizes and types and is adjustable to insure that the seeds are presented to the liquid chemical in a uniform substantially single layer thickness.

Another object is to provide a novel and improved seed-treating machine constructed and arranged to prevent the formation of seed clusters in seeds which are only partially delinted and to break up such clusters in the event of their formation prior to being introduced into the machine.

Another object is to provide an improved seed-treating machine which utilizes a combination of gravity and centrifugal force to induce a rolling action to the individual seeds whereby the actual coverage of the application of the liquid chemical to the individual seeds is increased.

Another object is to provide a novel seed-treating machine which will automatically clean itself when its operation is terminated.

Another object is to provide an improved seed-treating machine constructed and arranged to continuously activate and agitate the seeds prior to and during the liquid chemical treating operation to effectively preclude balling and matting of the same, more particularly when the seeds are of a partially delinted type.

Another object is to provide a novel seed-treating machine constructed and arranged to enable the operator to adjust the rate at which the seeds, regardless of their size and nature, will be distributed into the path of the liquid chemical and to utilize a seed distributing member which may be rotated at variable speeds, the seed distributing member and the chemical applying member being operated at different speeds and the seed distributing member being capable of having its speeds varied.

Another object is to provide an improved seed-treating machine which substantially eliminates bruising and cracking of the seeds and a consequent early spoilage thereof subsequent to the seed-treating operation.

These and other objects and advantages of our invention will more fully appear from the following description, made in connection with the accompanying drawings, wherein like reference characters refer to the same or similar parts throughout the several views, and in which.

Figures 1, 2, 3, 4, 5, 6:
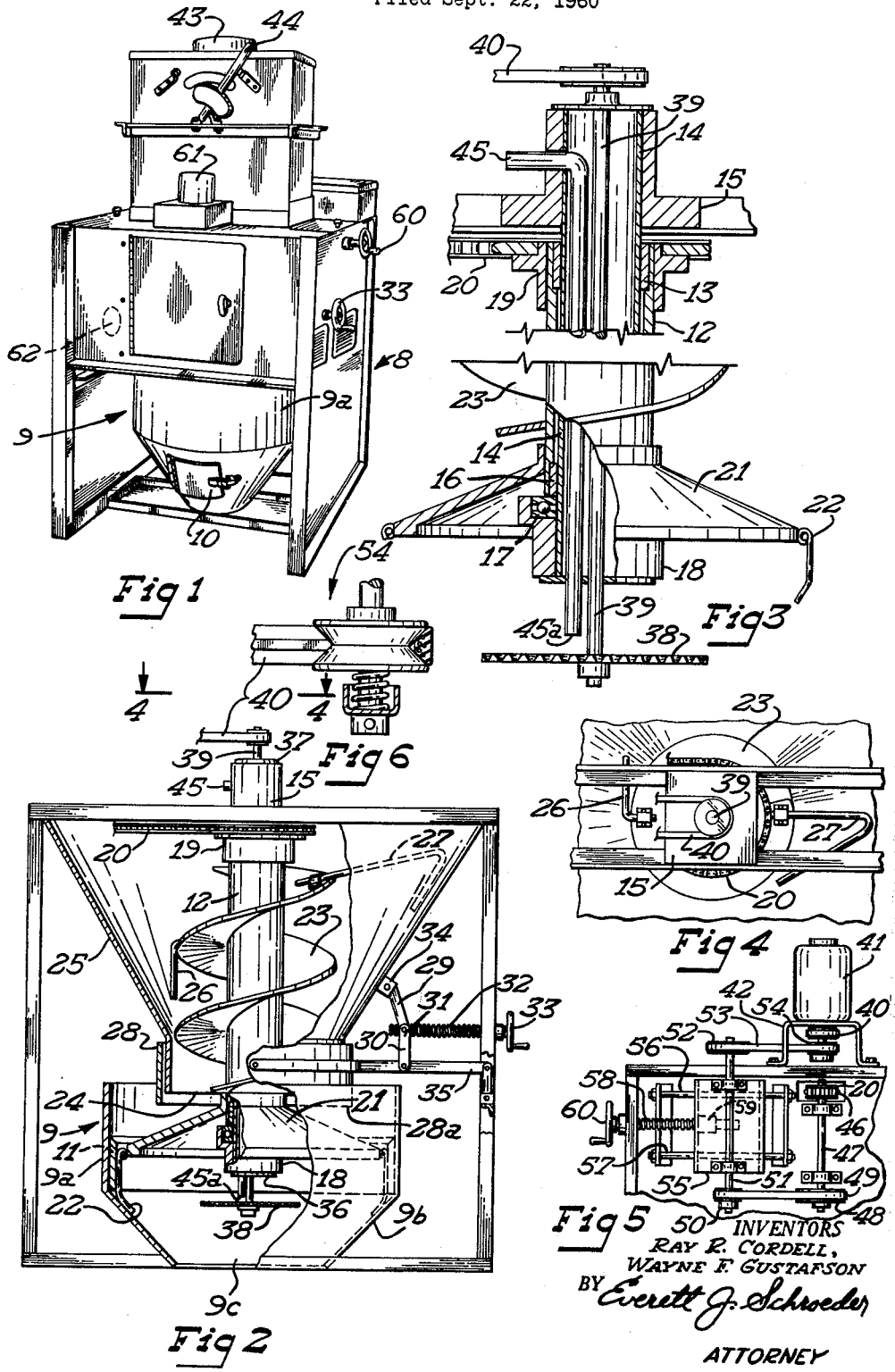
FIG. 1 is a perspective view of one embodiment of our invention.
FIG. 2 is a vertical sectional view of the same on an enlarged scale with parts thereof broken away to better show the construction thereof.
FIG. 3 is a fragmentary vertical sectional view on a still larger scale showing in greater detail the construction of the central shaft which carries the positive action feeder, the seed distributing member, and the mist applicator.
FIG. 4 is a fragmentary plan view of the positive action feeder and its agitators.
FIG. 5 is a diagrammatic view illustrating the variable speed drive and the manner by which a single motor is utilized to drive the positive action feeder and seed distributing member at various speeds and the mist applicator at a constant speed.
FIG. 6 is a fragmentary elevational view of one of the variable speed pulleys utilized in the construction shown in FIGS. 1–5.

Seed-treating machines as heretofore known have been entirely unsatisfactory for treating seeds such as cotton seeds and other seeds of a similar nature with liquid chemicals in order to prevent damage from fungi etc. Seeds such as cottonseeds present peculiar problems in that they are frequently only partially delinted and hence have a tendency to ball up prior to the chemical treating operation and subsequently thereto. Because of their inherent nature such seeds present a very troublesome problem in that it is difficult to obtain uniform distribution of the seeds in layers of the desired thicknesses and it is even more difficult to insure an adequate application of a liquid chemical to the seed individually. Because of the tendency to ball up, such seeds frequently do not receive an adequate application, some of the seeds receiving no treatment whatever and others receiving only a partial treatment. In the treatment of seeds, of course, it is particularly desirable to cover as much of the exterior surface as possible with the seed-treating chemical and ideally, the entire exterior surface of each individual seed would receive an application of such chemical. Our invention is designed to overcome the problems outlined above and to approach the ideal application as described above as nearly as possible from a practical standpoint.

One embodiment of our invention as shown in FIGS.

1–6 includes a frame indicated generally as 8 within which a housing 9 is mounted. As shown the housing 9 has a substantially vertical section 9a and an inwardly tapering section 9b which is provided with a discharge opening 9c at the bottom. An inspection door 10 is provided in the side wall structure of the tapered portion 9b. An annular reinforcement member 11 is secured as by welding within the inner surface of the housing 9. It will be readily appreciated that the housing 9 and annular member 11 can be made integrally.

Mounted within the housing 9 for rotation about an upright axis is a hollow shaft 12. This shaft 12 rotates on a bronze bushing 13 at its upper end around a central tube 14 which is fixed to the casing 15 which in turn is supported by the frame 8. A similar bronze bushing 16 is carried by the central tube 14 at its lower end. A ball bearing 17 is mounted on the lower end of the central tube 14 and is held in place by the casting 18 which is rigidly secured to the central tube 14 at its lower end. The outer rotatable hollow shaft 12 has its lower end bearing against the ball bearing 17 as best shown in FIG. 3. The upper end of the outer tube 12 is fixedly secured to a rotatable casting 19 which is driven by a chain 20 which runs to the variable speed drive shown in FIG. 5 and to be hereinafter described more fully.

Fixedly secured to the lower end portion of the rotatable hollow shaft 12 is a conically shaped seed tumbling and distributing member 21. This cone 21 is provided at its more circumferential portions with a plurality of downwardly extending wipers 22 which are preferably formed, as shown, of resilient wire and bear against the interior surface of the housing 9 to effectively wipe the interior surface clear of any of the partially delinted seeds which tend to adhere to the conical surface of the conical portion 9b.

Fixedly mounted on the upper portions of the hollow tube 12 is a positive action auger type conveyor 23. This conveyor 23 is designed to positively carry the cottonseeds downwardly through the discharge 24 of the hopper 25 within which the conveyor 23 extends. Fixedly mounted on the outer peripheral portions of the flights of the auger 23 is a plurality of agitators. The agitators 26 extend downwardly and rearwardly as can be seen by reference to FIGS. 2 and 4 while the agitators 27 extend first outwardly and then downwardly and rearwardly and inwardly to pass along the inner surface of the hopper 25. The agitators 26 break up any balls or lumps of the partially delinted seeds which may have previously formed in the handling of the seeds while the agitators 27 effectively preclude clinging of the individual seeds along the inner surface of the hopper 25 and also aid in agitating the seeds so as to dislodge and separate the individual seeds relative to each other.

Extending around the discharge defining portions of the hopper 25 is a vertically extending collar 28. This collar 28 passes in close proximity to the discharge defining portions of the hopper 25 and is movable vertically in order to control the thickness of the layer of seeds which is distributed by the cone 21. It will be noted that the lower edge 28a of the annular collar 28 can be moved to a position in close proximity to the upper surface of the cone 21 which revolves relative to the collar 28 to cooperate therewith and with the auger 23 to provide a uniform distribution of the cotton seeds in substantially a single seed layer thickness.

The elevation of the collar 28 is controlled by means of a pair of links 29 and 30 each of which is pivotally connected to an internally threaded block 31 that is carried by a threaded member 32 which may be rotated by a hand crank 33. The upper end of the link 29 is pivotally connected by a bracket 34 to the outer surface of the hopper 25 and the lower end of the link 30 is pivotally connected to a lever 35 which in turn is rigidly connected to the collar 28. It will be readily appreciated that rotation of the threaded member 32 will cause the collar 28 to be raised or lowered depending upon the direction of rotation of the crank 33.

Mounted by means of bearings 36 and 37 within the fixed hollow tube 14 and extending coaxially with the auger 23 and the cone 21 is a mist disc 38 which has a serrated upper surface and is carried at the lower end of a shaft 39 which is driven by a belt 40 directly from the motor 41 which is mounted upon the upper surface of the frame 8. A bracket 42 supports the motor 41 on the frame as best shown in FIG. 5.

The seed is received within the hopper 25 through the seed chute 43 which is shown in FIG. 1. As the grain is received, it is metered by a metering mechanism similar to that disclosed in Patent No. 2,823,904. The counter weight arm 44 is shown in FIG. 1 and is a part of this metering system. In the embodiment shown in FIG. 1 there is also a liquid chemical metering mechanism associated and connected to the seed metering mechanism 44 in a manner similar to that shown in U.S. Patent No. 2,823,904 except that in the instant embodiment a dual tank arrangement is utilized to enable different chemicals to be alternatively applied or a blending of chemicals if such is desired. This portion of the embodiment disclosed herein is shown only generally in that the crux of the invention claimed herein is not contained in either the seed metering or the chemical metering mechanism. The type of mechanism shown in Patent No. 2,823,904 may be utilized to insure that the proper amount of liquid chemical is supplied to the mist applicator disc 38 while the machine is in operation.

The liquid chemical metering mechanism (not shown) is connected to a conduit 45 which, as shown in FIGS. 2 and 3, passes through the casting 15 and into the interior of the hollow tube 14 and descends along the shaft 39 throughout the length of the tube 14 and terminates with its lower end 45a immediately above the disc 38 so that the liquid chemical which is metered out into the tube 45 is finally ejected on to the upper surface of the rapidly rotating disc 38 whenever the machine is in operation.

The chain 20 which drives the hollow shaft 12, and with it the auger 23 and cone 21, is in turn driven by a sprocket 46 which is a part of the variable speed drive illustrated in FIG. 5. The sprocket 46 is secured to the counter shaft 47 which has a pulley of fixed diameter 48 at its lower end. A belt 49 passes around the pulley 48 and around a variable speed pulley 50 which is mounted on the lower end of a shaft 51. The shaft 51 carries a pulley 52 of fixed diameter at its upper end which is driven by a belt 53 that passes around a variable speed pulley 54 carried by the lower end of the drive shaft of the motor 41. The shaft 51 is movable to either the right or left as viewed in FIG. 5 to cause the pulleys 50 and 54 to close or spread respectively. To accomplish this lateral movement the shaft 51 is mounted upon a sliding plate 55 which extends vertically and is slidable horizontally on a pair of vertically spaced rods 56 and 57. These rods 56 and 57 are mounted upon the frame 8. A threaded member 58 extends through a threaded block 59 secured to the plate 55 so that when the threaded member 58 is rotated by the hand crank 60 the plate 55 and the shaft 51 will shift either to the right or the left, depending upon the direction of rotation of the threaded member. It will be readily appreciated that when the shaft 51 is drawn to the left as viewed in FIG. 5 the pulleys 50 and 54 will spread and consequently the speed of the auger and distributing cone 21 will be reduced while if the shaft 51 is moved to the right as viewed in FIG. 5, the speed of these members will be increased. Under this arrangement the speed of the auger and the cone 21 can be adjusted between 20–350 r.p.m.'s while the speed of the mist disc 38 remains constant at approximately 2,000 r.p.m.'s.

A source of suction (not shown), in the embodiment shown in FIG. 1, is connected to a suction pipe 61 which draws air and lint etc. from the area surrounding the belts 49 and 53 and the chain 20. A second suction outlet 62 is connected to a source of suction (not shown) and air, lint, dust, etc. is drawn therethrough from the areas surrounding the seed distributing member 21 in order to withdraw, in so far as possible, all free lint, dust, etc. which is normally attendant with the handling and movement of cotton seed.

In operation the seed is received through the chute 43 into the hopper 25 in metered amounts in accordance with the operation of the metering mechanism 44. Simultaneously a metered amount of liquid chemical is transmitted to the tube 45 and discharged upon the upper surface of the rapidly rotating disc 38. The seeds are positively carried downwardly through the discharge 24 of the hopper 25 by the auger type conveyor 23 which gradually forces the seed downwardly between the lower annular edge 28a of the collar 28 and the upper surface of the cone 21. In doing this the agitators 26 and 27 break up any balls or accumulations of the partially delinted seed and preclude their clinging to the side walls of the hopper 25 so that as the seed is forced below the lower edge of the collar 28 there are no previously formed balls or clumps and the individual seeds are free relative to each other except, of course, for the normal attachment which results from their inherent fuzziness due to the fact that they are only partially delinted. The rotating cone and the non-rotating collar 28 cooperatively distribute the seed in a tumbling and rolling manner outwardly against the inner surface of the housing 9. It will be noted that in this connection the force of gravity and the centrifugal force imparted to the individual seeds by the rotating cone 21 are utilized in such a manner that the seeds tend to roll and tumble rather than to be thrown directly outwardly against the walls of the housing. We have found that this tumbling action serves two purposes in that there is substantially less tendency for the seeds to crack and subsequently spoil and a rolling motion is imparted to the seeds which is of distinct advantage as hereinafter described.

The rolling motion imparted to the seeds is particularly helpful in insuring that a maximum amount of the exterior surface of the individual seeds is subjected to an application of the seed treating chemical which is sprayed in mist form by the mist disc 38. As a result of this tumbling action and the fact that the seeds can be submitted to the mist spray in substantially a single layer thickness, the effectiveness of the spraying operation is substantially enhanced. In other words we have found that we obtain much better coverage of the individual seeds as the result of this action. It will be noted that by vertical adjustment of the collar 28 we can insure that a very uniform distribution is obtained and that the thickness of the layer is maintained as desired. It will also be noted that through elevation of the collar 28 seeds of various diameters may be accommodated and properly treated. In this connection it should also be noted that the effective diameter of cottonseeds varies substantially in accordance with the extent to which such seeds have been successfully delinted. In other words the effective diameter of a cotton seed which has been delinted to a limited extent is substantially greater than that of a cotton seed which has been substantially completely delinted.

The wipers 22 serve to effectively wipe the surface of the housing free of any of the partially delinted seeds that would otherwise tend to accumulate thereupon. The wipers 22 rotate with the cone 21 and bear against the inner surface of the housing 9 to preclude any matting or collection of the partially delinted seeds after they have been subjected to the application of the liquid chemical by the action of the mist spray which radiates from the disc 38.

It will also be noted that when the machine disclosed herein ceases to operate, the cone 21 is automatically cleaned as in the interior surface of the housing 9. We have found that through the use of the rotating cone we obtain a much more satisfactory uniform distribution of the seeds relative to the application of the mist by the disc 38 with, of course, much more highly desirable results in that the success of a seed-treating machine is directly proportional to the effectiveness with which it adequately coats the individual seeds with an application of the liquid chemical.

We have found that the greater the extent to which the seeds have been permitted to retain their lint on their outer surface, the faster it is desirable to rotate the auger 23 in order to more effectively break up the lumps or chunks or balls of the seeds which will naturally form as the result of the existence of the excess lint. It will be noted that the agitator 26 effectively disintegrates any clumps of such seeds in the area adjacent the center of the hopper 25 while the agitator 27 performs the same function around the outermore portions thereof and at the same time wipes the inner surface of the hopper clear.

It will also be noted that the variable speed drive for the auger 23 and the cone 21 utilizes the same source of power as the constant speed drive of the mist disc 38. By means of this arrangement a single motor 41 may be utilized as a source of power for the entire machine.

From the above it will be seen that we have provided a novel seed-treating mechanism which effectively overcomes the disadvantages of machines heretofore known, particularly with respect to the treatment of seeds of the nature of cottonseeds wherein varying amounts of lint may be retained by the seeds when they are harvested.

It will be noted that the disc 38 because of its serrated upper surface and relatively high speed of rotation will break the liquid chemical into a mist and scatter it radially from within the generally conical formation of seed distribution caused by the rotating cone 21. The radially outward movement of the mist tends to cause the partially delinted seeds to tend to cling to the converging side walls 9b of the housing 9 but the downwardly and rearwardly extending wipers 22 repeatedly clear the surfaces to prevent matting. The rearwardly extending feature of the wipers 22 provides a self cleaning feature for these elements as does the rearward extension of the agitators 26 and 27 on the auger 23. This rearward extension feature of the agitators 26 and 27 can best be seen by reference to FIG. 4.

It will, of course, be understood that various changes may be made in the form, details, arrangement and proportions of the parts without departing from the scope of our invention which consists of the matter shown and described herein and set forth in the appended claims.

What is claimed is:

1. A cottonseed-treating machine comprising a housing, an upright shaft mounted for rotation about its longitudinal axis within said housing, means for rotating said shaft, a rotatable seed distributing member mounted upon said shaft within said housing for rotation therewith about an upright axis, a positive action type feeder movably mounted within said housing and moving seeds to said seed distributing member, a seed hopper surrounding said feeder and having a discharge at its lower end through which said feeder moves seeds, a seed flow controlling collar surrounding said hopper discharge and said feeder and controlling the flow of seeds across said seed distributing member, a disc mounted for rotation in a horizontal plane a short distance beneath said cone, means for rapidly rotating said disc, means for applying a seed treating liquid onto the upper surface of said disc as it rotates whereby the liquid will be broken into a radially outwardly moving mist, a plurality of outwardly extending wipers carried by said seed distributing member and moving therewith and bearing against said housing to free the inner surface thereof adjacent said disc of seeds, and a plurality of agitators mounted on said feeder and moving therewith within said hopper to break up masses of seeds which form as a result of being incompletely delinted.

2. A cottonseed-treating machine comprising; a housing, an upright hollow shaft mounted for rotation about its longitudinal axis within said housing, means for rotating said shaft, a rotatable seed distributing cone mounted on said shaft within said housing for rotation therewith about an upright axis, a seed hopper surrounding said shaft within said housing and having a discharge at its lower end through which seeds from said hopper move, a positive type feeder connected to said shaft for rotation therewith and adapted to positively move seeds through said hopper to the discharge thereof, flow control means associated with said hopper at the discharge thereof and disposed adjacent said cone and intermediate its extent being adjustable to control the flow of seeds from said hopper discharge across said cone, a plurality of agitators attached to the positive seed feeder and extending outwardly from the feeder within said seed hopper arranged to move the seeds toward the positive type feeder and the seed distributing cone, a horizontal disc mounted coaxially with said shaft a short distance beneath said cone for rotation about an upright axis, means for rapidly rotating said disc, wiper means attached to the seed distributing cone and cooperating with the housing to free the inner surface thereof of seeds adjacent to the horizontal disc, means including a conduit means extending through said upright hollow shaft for applying a seed treating liquid to the upper surface of said horizontal disc whereby the liquid will be broken up into a radially outwardly moving mist and applied uniformly to the seeds as they leave said cone, and suction means constructed and arranged to draw air from the area in which said seeds pass across the seed distributing cone.

3. A cottonseed-treating machine comprising a housing, an upright hollow shaft mounted for rotation about its longitudinal axis within said housing, means for rotating said shaft at variable speeds, a rotatable seed distributing cone mounted upon said shaft within said housing for rotation therewith about an upright axis, an auger type feeder mounted on said shaft for rotation therewith coaxially with said cone, a seed hopper surrounding said auger type feeder and having a discharge at its lower end through which said feeder moves seeds, a seed flow-controlling collar surrounding said hopper discharge and said feeder and having a lower annular edge disposed immediately above said cone and inwardly of the outer confines thereof, means connected to said collar for vertically adjusting the same to thereby control the flow of seeds across said cone, a disc mounted coaxially with said shaft a short distance beneath said cone for rotation about a vertical axis, means for rapidly rotating said disc, means for introducing a seed treating liquid into the interior of the upper portions of said hollow shaft and for discharging said liquid from the interior of said shaft upon the upper surface of said disc whereby the liquid will be broken into and spread as a radially outwardly moving mist, a plurality of outwardly, downwardly and rearwardly extending resilient wipers carried by the circumferential portions of said cone and bearing against said housing to free the inner surface thereof adjacent said disc of seeds, and a plurality of outwardly and downwardly extending agitators mounted on said auger and rotating therewith within said hopper to break up masses of seeds which form as a result of being incompletely delinted.

4. A cottonseed-treating machine comprising a housing, an upright hollow shaft mounted for rotation about its longitudinal axis within said housing, means for rotating said shaft, a rotatable seed distributing cone mounted upon said shaft within said housing for rotation about an upright axis, an auger type feeder mounted on said shaft for rotation therewith coaxially with said cone, a seed hopper surrounding said auger type feeder and having a discharge at its lower end through which said feeder moves seeds, a seed flow controlling tubular member surrounding said hopper discharge and said feeder and having a lower annular edge disposed immediately above said cone and inwardly of the outer confines thereof, means connected to said member for vertically adjusting the same to thereby control the flow of seeds across said cone, a disc mounted coaxially with said shaft a short distance beneath said cone for rotation about an upright axis, means for rapidly rotating said disc, means for introducing a seed treating liquid into the interior of the upper portions of said hollow shaft, and for discharging said liquid from the interior of said shaft upon the upper surface of said disc whereby the liquid will be broken into a radially outwardly moving mist, a plurality of outwardly and downwardly extending resilient wipers carried by the circumferential portions of said cone and bearing against said housing to free the inner surface thereof adjacent said disc of seeds, and a plurality of axially extending agitators mounted on said auger and rotating therewith within said hopper to break up masses of seeds which form as a result of being incompletely delinted.

5. A cottonseed-treating machine comprising a housing, an upright shaft mounted for rotation about its longitudinal axis within said housing, means for rotating said shaft, a rotatable seed distributing cone mounted upon said shaft within said housing for rotation about an upright axis, an auger type feeder mounted on said shaft for rotation therewith coaxially with said cone, a seed hopper surrounding said auger type feeder and having a discharge at its lower end through which said feeder moves seeds, a seed flow controlling collar surrounding said hopper discharge and said feeder and having a lower edge disposed immediately above said cone and inwardly of the outer confines thereof, means connected to said collar for vertically adjusting the same to thereby control the flow of seeds across said cone, a horizontal disc mounted coaxially with said shaft a short distance beneath said cone for rotation about an upright axis, means for rapidly rotating said disc, means for applying a seed treating liquid to the upper surface of said disc whereby the liquid will be broken into a radially outwardly moving mist, a plurality of outwardly extending wipers carried by said cone for rotation therewith and passing in close proximity to the inner surface of said housing to free the same of seeds, and a plurality of agitators mounted on said auger and rotating therewith within said hopper to break up masses of seeds which form as a result of being incompletely delinted.

6. A cottonseed-treating machine comprising a housing, an upright hollow shaft mounted for rotation about its longitudinal axis within said housing, means for rotating said shaft, a rotatable seed distributing cone mounted upon said shaft within said housing for rotation therewith about an upright axis, an auger type feeder mounted on said shaft for rotation therewith coaxially with said cone, a seed hopper surrounding said auger type feeder and having a discharge at its lower end through which said feeder moves seeds, a seed flow controlling collar surrounding said hopper discharge and said feeder and having a lower annular edge disposed immediately above said cone and inwardly of the outer confines thereof, means connected to said collar for vertically adjusting the same to thereby control the flow of seeds across said cone, a disc mounted coaxially with said shaft a short distance beneath said cone for rotation about a vertical axis, means for rapidly rotating said disc, means for introducing a seed treating liquid into the interior of the upper portions of said hollow shaft and for discharging said liquid from the interior of said shaft upon the upper surface of said disc whereby the liquid will be broken into a radially outwardly moving mist, and a plurality of agitators mounted on said auger and rotating therewith within said hopper to break up masses of seeds which form as a result of being incompletely delinted.

References Cited in the file of this patent

UNITED STATES PATENTS

| | | | |
|---|---|---|---|
| 301,506 | Massey | July 8, | 1884 |
| 1,235,427 | Bridewell et al. | July 31, | 1917 |
| 1,310,037 | Snelling | July 15, | 1919 |
| 1,604,845 | McKenney | Oct. 26, | 1926 |
| 2,229,725 | Cheasley | Jan. 28, | 1941 |
| 2,279,640 | Ringmarck | Apr. 14, | 1942 |
| 2,319,865 | James | May 25, | 1943 |
| 2,352,749 | Wills | July 4, | 1944 |
| 2,563,475 | Mahoney | Aug. 7, | 1951 |
| 2,806,788 | Leker | Sept. 17, | 1957 |
| 2,862,511 | Forsberg | Dec. 2, | 1958 |
| 2,954,902 | Stokland | Oct. 4, | 1960 |
| 2,990,807 | Gerow | July 4, | 1961 |

FOREIGN PATENTS

| | | | |
|---|---|---|---|
| 560,731 | Great Britain | Apr. 18, | 1944 |